Feb. 9, 1971  PERSHING NAKADA ET AL  3,561,877
HEMATOCRIT READER
Filed June 30, 1967  7 Sheets-Sheet 1

Inventors
Pershing Nakada
Clarence H. Hambel
Fred K. Suzuki
By
Prangley, Baird, Clayton, Miller & Vogel
Attys.

FIG. 3

Feb. 9, 1971    PERSHING NAKADA ET AL    3,561,877
HEMATOCRIT READER

Filed June 30, 1967    7 Sheets-Sheet 3

FIG. 4

Inventors
Pershing Nakada
Clarence H. Hambel
Fred K. Suzuki

By
Prangley, Baird, Clayton, Miller & Vogel.
Attys.

Inventors
Pershing Nakada
Clarence H. Hambel
Fred K. Suzuki

FIG. II

United States Patent Office 3,561,877
Patented Feb. 9, 1971

3,561,877
HEMATOCRIT READER
Pershing Nakada, Elmhurst, Clarence H. Hambel, Clarendon Hills, and Fred K. Suzuki, Skokie, Ill., assignors to Delta Research, Inc., Chicago, Ill., a corporation of Illinois
Filed June 30, 1967, Ser. No. 650,267
Int. Cl. G01b *11/22;* G01f *23/00;* G01n *21/24*
U.S. Cl. 356—158                                26 Claims

ABSTRACT OF THE DISCLOSURE

This invention relates to a hematocrit tube reader in which the hematocrit tube is scanned by means of a light source and photocell to detect the volumes of the plasma and of the blood cells and to produce from that information a voltage output that is calibrated directly in percentage of blood cell volume in relation to the total sample volume. A light source directs light at a photocell through the tube to be read as the tube is moved lengthwise past the cell. The photocell in response to the differences in the light transmission characteristics of the tube actuates electro-mechanically an indicator which shows the ratio of the volume of blood cells to the total sample volume.

---

This invention relates to a hematocrit tube reader. More particularly, it relates to a hematocrit tube reader which visually indicates the percentage volume of blood cells in the sample being read.

One of the more widely used tests in blood analysis involves determination of the percentage volume of a blood sample which is occupied by red blood cells. In making this test, the blood sample is taken up in a capillary or hematocrit tube approximately 3" in length and having an internal diameter of approximately $\frac{1}{16}$". One end of the tube is thereafter sealed in any desired manner as by inserting a plug such as clay therein or by heating to melt the glass or by any other desired means. The tube is then centrifuged to pack the red blood cells against the seal leaving a volume of clear plasma between the packed cells and the open end of the tube. The hematocrit reading is then made by comparing the length of the tube portion occupied by the red blood cells with the length of the tube portion occupied by the whole sample, i.e. blood cells plus plasma, the result usually being stated, as indicated above, in terms of the percentage of the volume of the whole blood sample which is occupied by the red blood cells.

Various aids for use in reading the hematocrit tubes have heretofore been employed. They generally involve some sort of graduated scale on which the tube is placed or with which it is compared to make the reading. Reading the hematocrit tubes with or without such previously known aids have been tedious and time consuming and of limited accuracy depending to a large extent on the care and skill of the person making the reading.

It is an object of this invention to provide a hematocrit tube reader which itself makes the measurement of the percentage volume of the sample which is occupied by the red blood cells and visually indicates the percentage which is so read.

A further object is to provide a reader which after a tube has been placed therein, and its operation has been initiated automatically performs the operations of reading the tube and giving the visual indication.

A still further object is to provide a hematocrit tube reader wherein the reading of the tube is accomplished by scanning the same with a light source and a photocell.

Other objects will appear hereinafter.

It has now been found that the foregoing objects may be accomplished by providing a hematocrit tube reader in which the hematocrit tube is scanned by means of a light source and a photocell and the responses of the photocell are converted by electromechanical means into the desired visual indication of percentage volume of the blood sample which is occupied by the red blood cells. In the preferred embodiment of the invention, the tube reader is automatic in operation so that once the tube has been inserted and the operation of the reader initiated, the scanning and production of the visual indication occurs automatically without any intervention by the operator.

In order that the invention may better be understood, reference is made to the accompanying drawings which form a part of this specification and in which.

The hematocrit reader designated generally 20 which is shown in the drawings is provided with a housing formed in four parts, namely a part 22 which provides a bottom wall with an upstanding flange along its rear edge, a front angular wall, and a portion of the top wall, two portions 24 and 26 provided with inwardly extending flanges which serve as the side walls and a portion 28 which provides the back wall and the remainder of the top wall. The housing is held together by suitable fasteners such as the fasteners 30 which extend through the housing portions 22 and 28 and are secured to the flanges on the side walls 24 and 26 and to the flanges on the rear of the portion 22.

Figure 1:
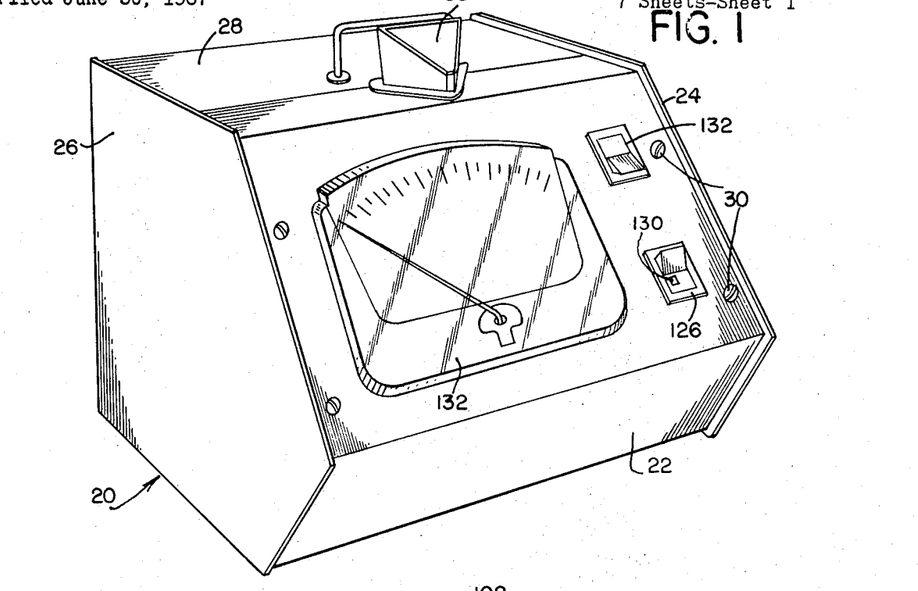
FIG. 1 is a view in perspective of a hematocrit reader embodying the features of the present invention.
Figure 3:
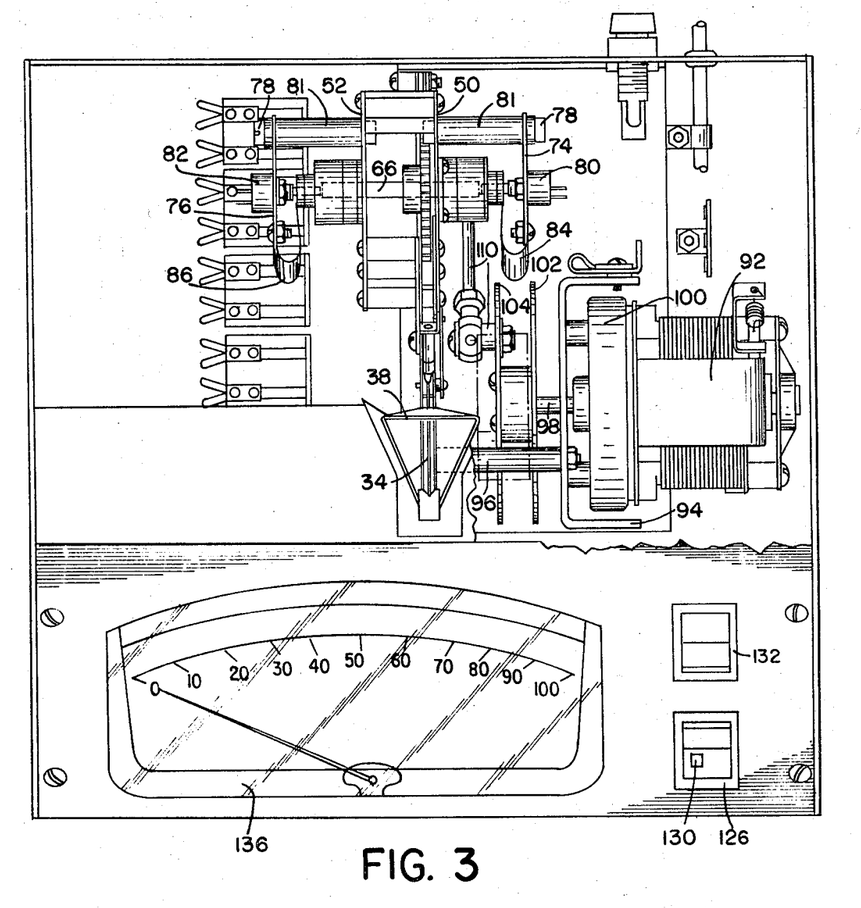
FIG. 3 is a plan view of the reader shown in FIG. 1 with the top removed.
Figure 4:
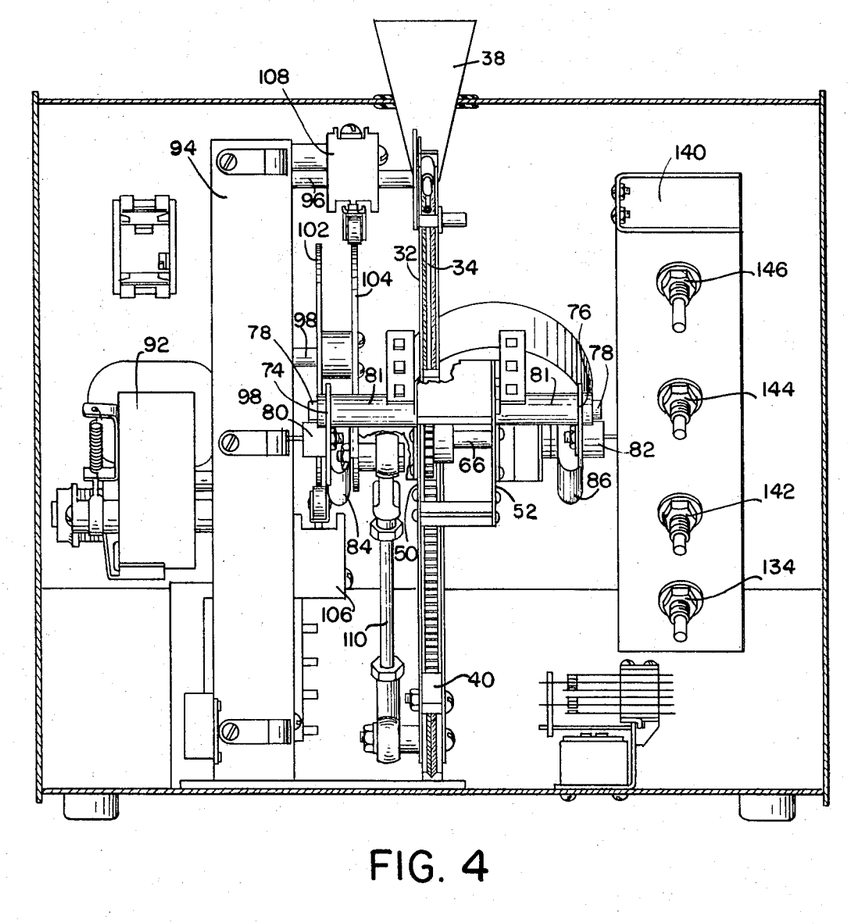
FIG. 4 is a rear elevation of the reader shown in FIG. 1 with the back removed.
Figure 5:
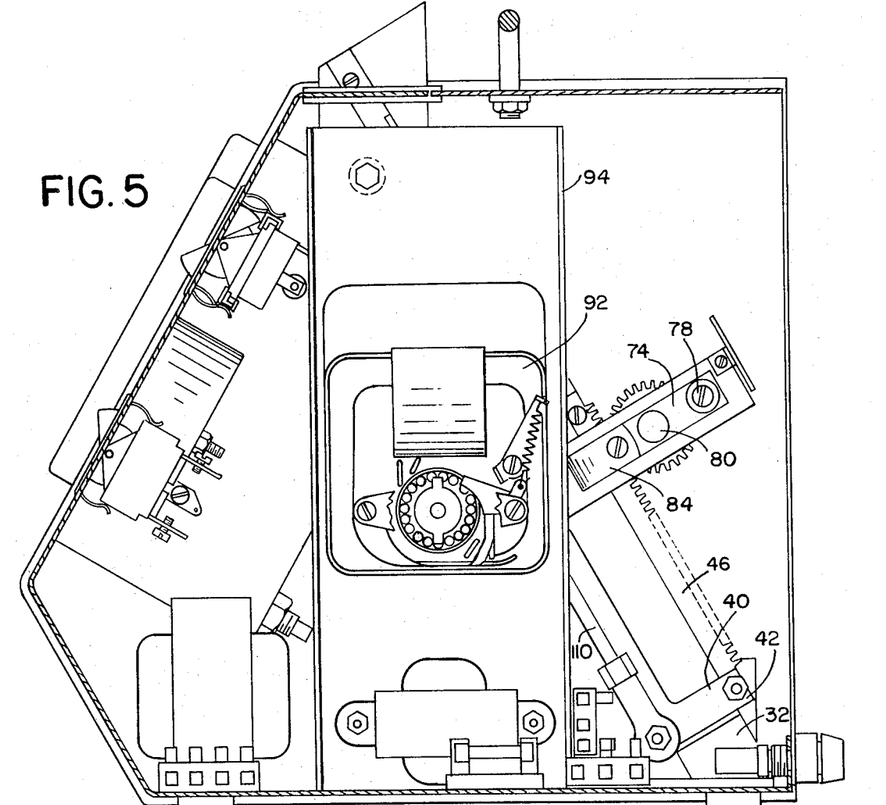
FIG. 5 is a right hand elevation of the reader shown in FIG. 1 with the right wall removed.
Figure 9:
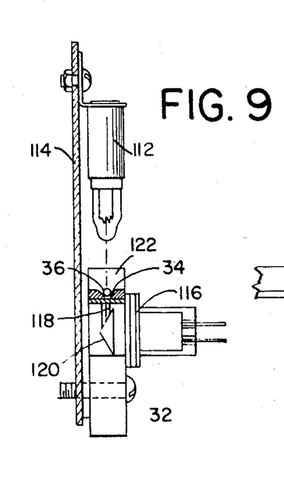
FIG. 9 is an enlarged view partly in cross section on the line 9—9 in FIG. 6.

Suitably supported on the housing portion 22 is an inclined slide 32 which extends generally centrally between the side walls from the top of the wall portion 22 downwardly to the rear of the bottom wall. This slide 32 is formed with a V-groove 34 in its upper surface which as best seen in FIG. 9 is of a suitable size to receive in slidable relation a hematocrit tube 36. Mounted on the upper end of the slide 32 and extending through the top of the housing portion 22 is a funnel guide 38, the configuration of which is indicated in FIGS. 1, 3 and 4 which serves to position the hematocrit tube inserted therein in its proper position in the groove 34.

The slide 32 also carries a pusher mechanism 40 which reciprocates thereon in a direction lengthwise of the groove 34. As best seen in FIGS. 2, 5, 6 and 7, the pusher mechanism 40 comprises a pair of side members 42 and 44 which are generally channel shaped. The members 42 and 44 adjacent the upper ends of the channel arms are bolted to the appropriate sides of rack 46 which slides on the upper surface of the slide 32, rack 46 being of suitable width to enable the pusher mechanism 40 to move freely on the slide. The side members 42 and 44 are also secured together below the slide 32, suitable spacers 48 (see FIG. 7) being provided to prevent the members 42 and 44 from being clamped against the slide 32.

Figure 6:
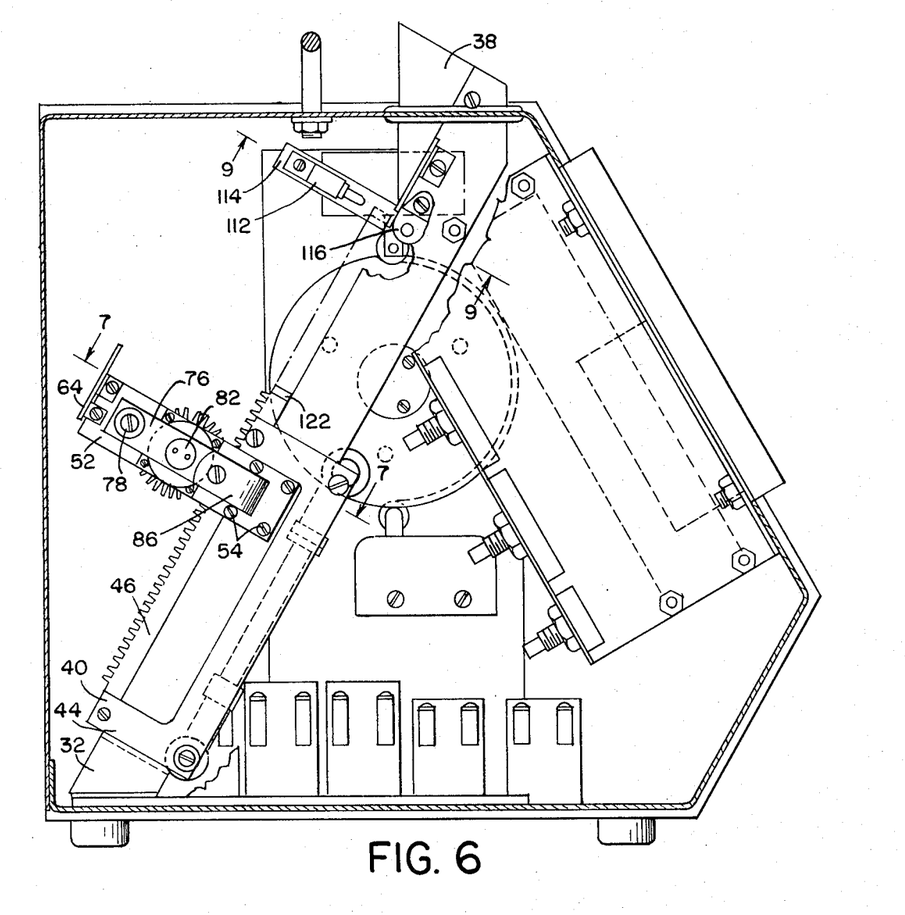
FIG. 6 is a lift side elevation of the reader shown in FIG. 1 with the left wall removed.
Figure 7:
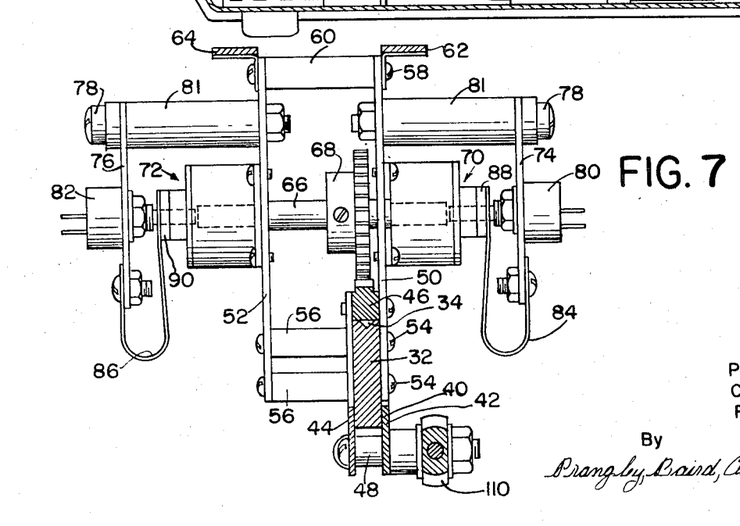
FIG. 7 is a view partly in cross section on the line 7—7 in FIG. 6.
Figure 8:
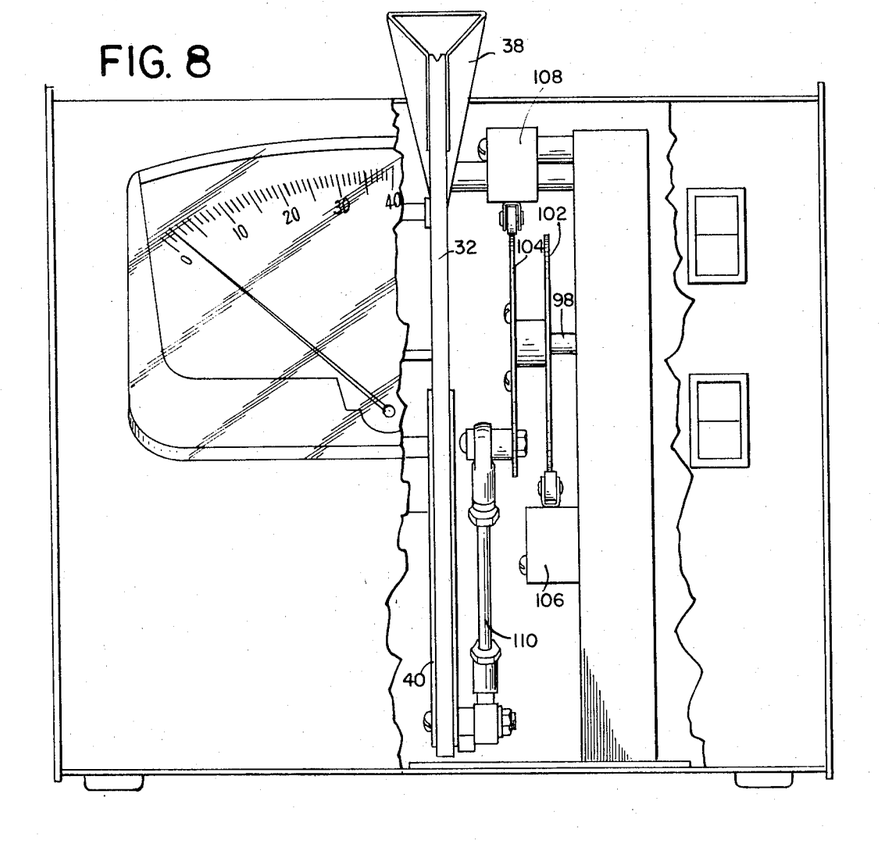
FIG. 8 is a front view of the reader shown in FIG. 1 with portions of the front wall broken away.

Referring now to FIGS. 3, 4, 6 and 7, it will be seen that intermediate the upwardly extending arms of the members 42 and 44 a pair of plates 50 and 52 are secured to the slide 32 adjacent their lower ends by fasteners 54. As shown in FIG. 7, the plate 50 is clamped against the side face of the slide 32, but the plate 52 is spaced away from the other side face by spacing collars 56 carried by the fasteners 54. The plates 50 and 52 are also secured to each other adjacent their upper edges by fasteners 58 which carry spacing collars 60 to provide the desired spaced relationship between those plates. The fasteners 58 also serve to secure to the plates 50 and 52 a pair of terminal strips 62 and 64.

The plates 50 and 52 among other things serve to provide bearings for a shaft 66. Secured on the shaft 66 between the plates 50 and 52 is a pinion 68 which meshes with the rack 46 to rotate the shaft 66 as the pusher mechanism 40 is reciprocated on the slide 32. Mounted on the ends of the shaft 66 outside of the plates 50 and 52 are the driving portions of a pair of magnetic clutches 70 and 72, the housing for which are bolted respectively to the plates 50 and 52.

Referring now to FIGS. 3, 4, 5, 6 and 7, it will be seen that the plates 50 and 52 have bolted thereto above the shaft 66, a pair of depending plates or strips 74 and 76. The depending strips 74 and 76 are secured in the desired spaced relationship to the plates 50 and 52 by bolts 78 and spacing collars 81. The plates 74 and 76 support respectively precision potentiometers 80 and 82, with their shafts in alignment with the shaft 66. The shafts of the potentiometers 80 and 82 in turn have secured thereon, respectively, in driving relationship the driven portions of clutches 70 and 72.

Bolted to the strips 74 and 76, respectively, adjacent their lower ends are spring strips 84 and 86 formed with a U-bend therein as shown. The spring strips 84 and 86 serve to provide brakes for the shafts of the potentiometers 80 and 82, and for this purpose, have secured on their free ends brake pads 88 and 90 which may be formed, for example, of cork. Aligned openings are provided in the strips and pads so that they may be received, as shown in FIG. 7, on the shafts of the potentiometers 80 and 82. The strips 84 and 86 are biased to urge the pads 88 and 90 against the driven portions of the clutches 70 and 72 to insure that rotation of the potentiometers stops as soon as the clutches are disengaged.

Directing attention next to FIGS. 2, 3, 4 and 5, it is pointed out that the reader is driven by a slow speed motor 92 which is mounted on an upwardly extending channel shaped support 94 secured to the bottom section of the cover portion 22. Support 94 is also braced at the top by a connection 96 secured to the slide 32. The motor 92 through speed reducing gears, not shown, drives a shaft 98 journaled at one end in the gear housing 100 and extending through the upright 94. Secured on this shaft are a pair of cams 102 and 104. Cam 102 serves to actuate a microswitch 106, and cam 104 serves to actuate a second microswitch 108, as will be more fully explained hereinafter. Through a crank 110 cam 104 also serves to reciprocate the pusher mechanism 40 on the slide 32.

Figure 10:
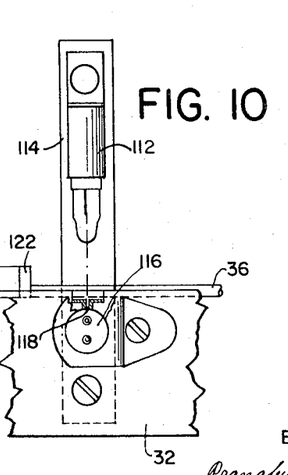
FIG. 10 is a right side elevation of the portions of the reader shown in FIG. 9.

As illustrated in FIGS. 6, 9 and 10, a light source 112 is mounted above the V-groove on a bracket 114 secured to the slide 32 and in line with the light source 112, a photocell 116 is mounted in a hole in the side of the slide 32. A .025" diameter hole 118 also in line with the light source, extends from the V-groove 34 down to the opening in which the photocell 116 is mounted. Light from the source 112 is directed by a polished reflective surface 120 into the photocell 116.

Still referring to FIGS. 6, 9 and 10, it is further pointed out that the rack 46 has a polytetrafluoroethylene pad 122 secured on its upper end which, as indicated in FIG. 10, extends down into the groove 34 to provide a tube engaging surface on which the tubes 36 rest as they are being read. It is also important to note that the light source 112, photocell 116 and opening 118 are so positioned that when the pusher mechanism 40 is in its lowermost position, a tube 36 in the groove 34 and in engagement with the pad 122 extends only about 1/8" above the opening 118. This is to insure, as will more fully appear, that the initial scanning will begin on the empty area of the glass tube.

Figure 11:
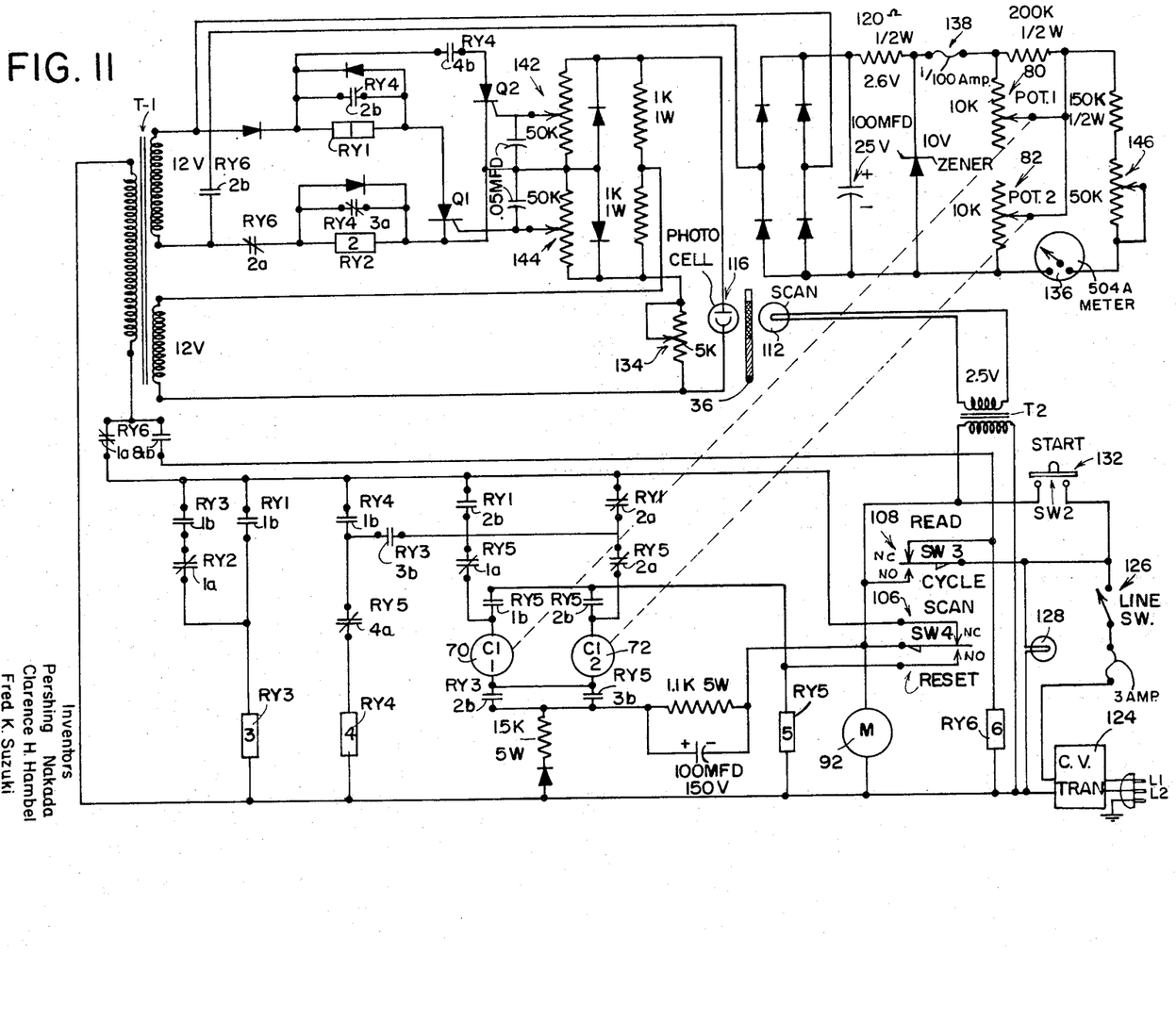
FIG. 11 is a circuit diagram of the reader shown in FIG. 1.

Turning next to FIG. 11, which is the circuit diagram, it is believed that in the main, the various components of the circuit are sufficiently identified thereon as to their nature and values by appropriate legends so as to make it unnecessary to describe them in detail in this written description. Such of the components of the circuit, as have been hereinbefore identified by reference numerals have the same numerals applied thereto in FIG. 11.

Supplementing the disclosure provided by the legends in FIG. 11, it is pointed out that it is preferable that the current for the operation of the reader 20 be passed through a 118 volt constant voltage transformer, as indicated at 124, in order to provide more consistent results in the readings obtained. As best seen in FIGS. 1 and 3, the line switch 126 shown in FIG. 11 is mounted on the front face of the reader in order to be readily accessible. A pilot light 128, which as indicated in FIG. 11, is lighted whenever the line switch 126 is closed, is conveniently positioned so that it may be seen through a window 130 in the operating button of the switch 126. Also mounted on the front panel of the reader 20 is the start switch 132 which, as will be explained, is depressed momentarily in order to initiate the operation of the reader.

Turning next to a description of the complete operating cycle of the reader, it is pointed out that the reader always stops and starts with the pusher mechanism 40 in its uppermost position. At this point, the operator on microswitch 108 is seated in the single indentation in the cam 104. Under these circumstances, the microswitch 108 is in what is designated at its normally closed position in FIG. 11 which, as may be seen, cuts off the power supply to the motor and the entire clutch control circuitry and supplies power only to the read out circuit.

Figure 12:
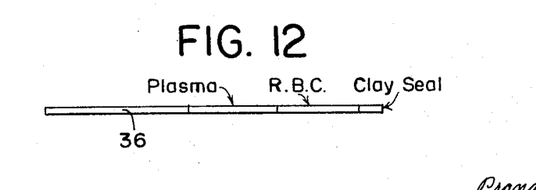
FIG. 12 is a view of a hematocrit tube.

With the preliminary explanation, it is next pointed out that to make a reading, a hematocrit tube, such as the tube 36 shown in FIG. 12, is dropped into the funnel guide 36 which directs it into a position such that it lies in the groove 34 with its lower end in engagement with the pad 122. Before or after dropping in the tube 36, the line switch 126 is closed and the start button 132 is thereafter depressed momentarily. This shorts the normally open side of the microswitch 108 allowing the motor 92 to operate. As soon as the motor 92 advances, the operator on microswitch 108 moves out the depression in the cam 104 thereby completing a circuit through the normally open contact of that microswitch and retaining power on the motor for one complete revoltion of the cam 104.

During the first half cycle as the downstroke of the pusher mechanism 40, microswitch 106 is actuated by cam 102, thereby completing a circuit through its normally open contact which supplies power to relay 5. Relay 5 through the opening of its contacts designated 1a and 2a in FIG. 11 and the closing of its contacts designated 1b, 2b and 3b, applies a DC voltage to both clutch 70 and clutch 72 causing the shafts of the associated potentiometers 80 and 82 to be turned toward their zero positions as the pusher mechanism 40 moves downwardly. The power on the clutches is such that they will slip when the potentiometers engage the mechanical stops provided at the zero positions. As the pusher mechanism 40 moves downwardly, the hematocrit tube 36 follows it under the influence of gravity until as indicated above, at the lowermost position of the pusher mechanism 40, all but 1/8″ of the top of tube 36 is below the path of the light from the light source 112 to the photocell 116.

At this time, the cam 102 actuates the microswitch 106 to break the circuit therein through its normally open contact and to complete a circuit through the normally closed contact, thereby transferring power from the reset circuit to the scan circuit. This de-energizes relay 5, thereby shifting control of clutches 70 and 72 to relay 1 and relay 3. The circuit through the normally closed contact of microswitch 106 also applies power to the transformer T1 through the normally closed contacts of relay 6.

The light source 112 for scanning is supplied by a 2½ volt lens end lamp deriving its power from transformer T2. Since as may be seen from FIG. 11, this transformer T2 is connected in parallel with the motor 92, lamp 112 goes on with the motor and remains on all the time the motor is operating.

The scanning photocell 116 is of the cadmium-selenide type and its resistance varies inversely with the amount of light admitted to it. As appears from FIG. 11, photocell 116 is connected in an alternating current Wheatstone bridge configuration which is balanced by the 5,000 ohm potentiometer 134 so that, at the light level seen by the photocell, as light passes through the empty tube, no output voltage is delivered by the bridge circuit. Accordingly, since the light from the source 112 is passing through the upper empty portion of the hematocrit tube 36 (the tube always being inserted in the reader 20 with its sealed end lowermost) when power is applied to the scanning circuit at the end of the first half cycle as above described, no output voltage is delivered by the bridge circuit.

This condition holds until the hematocrit tube has been pushed up far enough in the slide so that the light source 112 begins to pass through the plasma portion of the blood sample. Due to the light concentrating effect of a clear liquid such as the plasma inside the round tube, the tube then acts as a lens directing more of the light into the photocell 116 than was directed thereinto when the light was passing through the empty portion of the tube 36, thus reducing the resistance of the photocell 116. Since the two secondary windings of the transformer T1 are phased so that when the resistance of the photocell decreases below the balance point of the bridge a positive voltage is impressed on the gate of the silicon controlled rectifier Q1 during the same portion of the alternating current cycle that a positive voltage appears on the anode of Q1 through the winding of relay 1, the additional light entering the photocell 116 triggers rectifier Q1 into conduction energizing relay 1.

The energizing of relay 1 energizes relay 3 through the normally open contacts of relay 1 designated 1b in FIG. 11 in which position it is locked by its own contacts 1b through the normally closed contacts of relay 2 designated 1a. The energizing of relay 3 by closing the normally open contacts of that relay which are designated 2b closes the circuit connecting the common side of clutches 70 and 72 to the DC voltage source shown. The energizing of relay 1 also completes the circuit of clutch 70 to the other side of the power source through its normally open contacts 2b. This then causes the potentiometer 80 to be advanced during the interval that the photocell 116 sees blood plasma.

The continued upward movement of the hematocrit tube 36 eventually brings it to a point where the light beam from the source 112 begins to intersect the mass of red blood cells. At this point, due to absorption of light by the red cells, the amount of the light reaching the photocell 116 decreases below the light level seen by the photocell 116 when the light is passing through the empty tube. This then causes the resistance of the photocell 116 to increase above its value when the bridge circuit is balanced as described above, thereby switching off the silicon controlled rectifier Q1, This then returns relay 1 to its inoperative state switching off clutch 70 through the opening of the relay 1 contacts 2b and switching on clutch 72 through the closing of the normally closed contacts of relay 1 designated 2a. The closing of the 2a contacts of relay 1 also energizes relay 4 through the relay 3 contacts designated 3b which were closed at the time relay 3 was energized by the triggering of rectifier Q1. The resulting closing of the 1b contacts of that relay 4, locks it in, the opening of the 3a contacts removes the shunt around relay 2 in the circuit including it and rectifier Q1, the closing of the 2b contacts shorts relay 1 out, the closing of the 4b contacts completes a circuit including rectifier Q2, and relay 2.

The energizing of clutch 72 causes potentiometer 82 to be advanced during the interval that the photocell 116 sees red blood cells. The continued upward movement of the tube 36 finally brings it to a point where the light from the source 112 begins to fall on the clay sealed end of the tube 36, which cuts off all light from the photocell 116 thereby increasing the resistance of the photocell above that of the balance value which in turn imposes a positive voltage on the gate of silicon controlled rectifier Q2 triggering that rectifier into conducting and thereby energizing relay 2. The energizing of relay 2 by opening the contacts 1a of that relay breaks the holding circuit to relay 3 thereby de-energizing relay 3 which in turn opens its 2b contacts thereby breaking the common connection of clutches 70 and 72 which in turn de-energizes clutch 72 interrupting the advance of potentiometer 82. In this manner clutch 72 advances the potentiometer 82 during the period from the end of the clear liquid or plasma to the beginning of the clay sealed end of the tube 36.

Thereafter the upward movement of the tube 36 continues until the motor 92 has driven the cam 104 through one complete revolution at which time the operator of microswitch 108 drops into the recess in the cam 104 allowing microswitch 108 to drop back to its normal position completing a circuit through its normally closed contact. This stops the motor 92 and also disconnects power from the entire clutch control circuitry and at the same time energizes relay 6. The energizing of relay 6 by opening the 1a contacts of that relay and closing the 1b contacts thereof, disconnects transformer T1 from its previous source of power through microswitch 106 and connects it to power supplied through microswitch 108. The energizing of relay 6 through the closing of its 2b contacts and the opening of its 2a contacts transfers the output of one of the secondary windings of transformer T1 from the rectifier circuit to the read-out circuit.

In the read-out circuit, the AC voltage from this secondary winding of transformer T1 is rectified by four diodes in a full wave bridge configuration, filtered by a 100 microfarad electrolytic capacitor and regulated to exactly 10 volts by a Zener diode as shown. This regulated 10 volts DC is impressed across both potentiometer 80 and potentiometer 82 in series. A microammeter 136 which, as shown in FIGS. 1 and 3, is mounted on the front face of the reader 20 is connected with suitable multiplier resistors to read the voltage drop across potentiometer 82 in relation to the sum of the total voltage drop across both potentiometers i.e. 10 volts. The ammeter 136 is calibrated from 0 to 100%.

It has been previously pointed out that the potentiometers 80 and 82 are precision potentiometers and it is now further noted that these potentiometers are so constructed that as they are moved from their zero position as described above at which they have no resistance, their resistance increases in direct proportion to the extent of the angular movement of their shafts. Accordingly potentiometer 80 being driven only during the period when the photocell was seeing clear liquid or plasma will have been set, thereby to a resistance proportional to the length and thus the volume of the plasma portion of the tube 36. Similarly, the potentiometer 82 having been driven only during the period when the photocell 116 was seeing red blood cells will have been moved to a position in which its resistance is proportional to the length of the red blood cell portion and thus its volume.

Therefore, the resistance of potentiometer 82 divided by the sum of the resistances of potentiometers 80 and 82 is equal to the volume of the red blood cell mass divided by the total blood sample volume. By reason of the fact that a regulated voltage is impressed across both potentiometers and of the fact that the ammeter 136 is calibrated for 100% at full scale reading at this voltage, the ammeter will read directly in percentage the ratio of the red blood cell mass to the total blood sample volume. There is a 200,000 ohm resistor connected across potentiometer 80 to minimize error caused by the loading effect of the microammeter.

The foregoing description which is directed to the reading of a hematocrit tube 36 which has a clay sealed end also applies to the reading of a hematocrit tube which has been sealed by heat with one exception. It will be recalled at the time the photocell began to see the clay seal, its resistance was increased above that of its balance value in the bridge circuit, thereby triggering silicon controlled rectifier Q2. If at this point the photocell had seen the heat sealed end of a tube instead of the clay, its resistance would have been decreased below its balance value in the bridge circuit because the heat sealed end acts as a lens concentrating the light on the photocell 116. In that event, the unbalance of the bridge circuit, instead of imposing a positive voltage on the gate of rectifier Q2 would have imposed a positive voltage on the gate of rectifier Q1 thereby triggering it. This however, would also have energized relay 2 as did the triggering of rectifier Q2 because the energizing of relay 4 as described above set up the circuit so that triggering of either Q1 or Q2 would energize relay 2. Following the energizing of relay 2 the subsequent operation would have been the same as described above in respect to the clay sealed tube.

It is noted that the reader operates as described on both the clay sealed tubes and the heat sealed tubes because the gate voltage for the rectifier Q2 is exactly 180° out of phase with that for rectifier Q1.

The circuit of the reader 20 is such that the meter 136 will continue to read the volume of the last sample run until the power switch 126 is turned off. Moreover, if it is subsequently turned on, the meter will again return to that previous reading and will not be changed until such time as the reader 20 has been operated through another cycle.

Operation of the reader 20 without a tube in the groove 34 will not harm the unit as the amount of light striking the photocell 116 will cause the potentiometer 80 to be driven through the full stroke of the pusher mechanism 40. Under normal operation of the unit, the resistance of the potentiometers 80 and 82 is such that their current limitations are not exceeded. It is important to note, however, that the unit should never be operated with an empty hematocrit tube because this will cause both potentiometers to be returned to zero and not advanced from this setting. As a consequence of this during the read portion of the cycle, the 10 volts D.C. would be impressed upon both potentiometers at thir zero positions and the resulting high current could damage the variable resistance elements in the potentiometers. To guard against this possibility a 1/100 ampere fuse 138 has been inserted in series with the regulated D.C. source.

Figure 2:
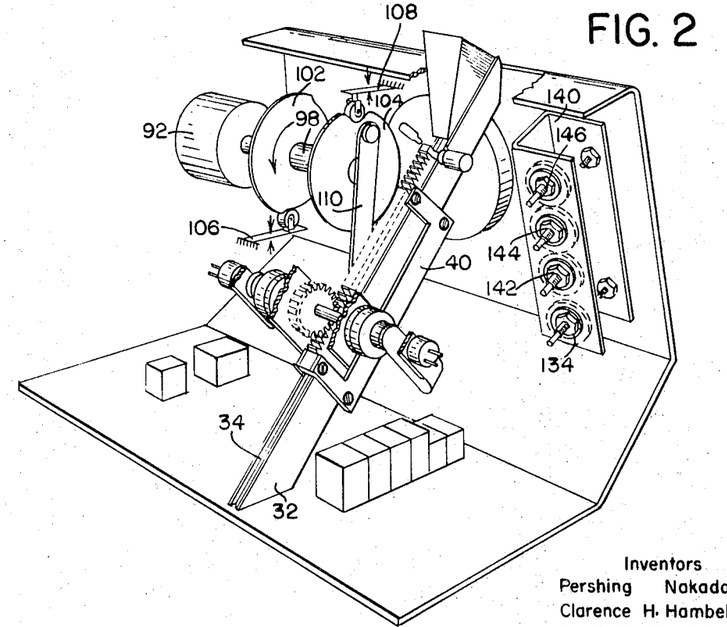
FIG. 2 is a more or less schematic view in perspective of the rear of the reader shown in FIG. 1 with the top, sides and back removed.

In order to improve the accuracy of the meter 20 various adjustment potentiometers are provided in the reader circuit. These potentiometers, as shown in FIGS. 2 and 4, are mounted on a channel shaped support 140 attached to the inner face of the front part of the housing portion 22.

The lowermost of these potentiometers is the potentiometer 134 to which reference was made in the description of FIG. 11. It serves to balance the Wheatstone bridge circuit so that at the light level seen by the photocell 116 as light passes through an empty hematocrit tube no output voltage is delivered by the bridge circuit. To obtain the desired setting of the potentiometer 134, it is preferable to unsolder one of the motor leads and rotate the motor shaft manually to raise or lower an empty glass capillary tube in the groove 34. An A.C. voltmeter is connected across the bridge circuit and the potentiometer 134 is adjusted to give a zero reading on that volt meter.

The potentiometer 142 mounted just above potentiometer 134 is provided to set the threshhold of rectifier Q2 in order to prevent false triggering of that rectifier. The potentiometer 144 which is second from the top similarly serves to set the threshhold of rectifier Q1 to prevent false triggering of that rectifier. These potentiometers 142 and 144 are set with the aid of a hematocrit tube containing a centrifuged blood sample, being adjusted so that the one set of relays is tripped by Q1 at the exact line of division of the plasma portion of the sample and the blood cell portion of the sample, and so that the other set of relays is tripped by Q2 at the exact line of division between the blood cell portion of the sample and the sealed end of the tube.

The uppermost potentiometer 146 is used to adjust the scale on the 50 microampere meter so as to cause the meter readings to coincide with readings made on the same hematocrit tube manually. The blood sample used for this calibration should be normal with a hematocrit reading in the 45% to 50% range. The exact setting of this potentiometer 146 will also vary depending upon whether the reader is reading a clay sealed tube or a heat sealed tube. Accordingly, it is preferable to set the potentiometer 146 for one particular type of tube and not to read any other type without resetting it to give a correct reading for the other type.

The advantages of this invention will be readily apparent from the foregoing description. It makes possible the automatic reading of hematocrit tubes speedily and with consistent accuracy when the reader is properly adjusted and calibrated as described above. The automatic operation serves to avoid the tediousness involved in reading hematocrit tubes as that has heretofore been accomplished.

It is apparent that many widely different embodiments of this invention may be made without departing from the spirit and scope thereof, and therefore it is not intended to be limited except as indicated in the appended claims.

We claim:

1. A reader for reading translucent tubes containing in uninterrupted succession an empty portion, a portion containing a clear liquid, a translucent portion containing solids and a portion which differs from the translucent solids containing portion in respect to its light transmitting characteristics which comprises a photocell, a light source spaced from and arranged to direct light at the said photocell, means for supporting a tube to be read so that it intersects the path of the light directed at the photocell by he said light source, means for producing relative movements between the said tube and the said light path so as to cause the photocell to scan the various portions of the tube in the aforesaid uninterrupted succession, and means controlled by the said photocell for indicating the ratio of the volume of the said solids containing portion to the combined volumes of the said solids and clear liquid containing portions of the tube.

2. A reader as described in claim 1 in which the photocell is of the cadmium-selenide type the resistance of which varies inversely with the amount of light admitted thereto.

3. A reader as described in claim 2 in which the means for producing relative movement is means for moving the tube relative to the light path.

4. A reader as described in claim 2 in which the means responsive to the photocell includes a pair of potentiometers driven, respectively, in synchronism with the means for producing relative movement during the scanning of the clear liquid containing portion and during the scanning of the solids containing portion.

5. A reader as described in claim 4 in which the said potentiometers are driven, respectively, by a pair of magnetic clutches.

6. A reader as described in claim 4 in which the said potentiometers are during the said scanning advanced from their zero positions, respectively, to positions in which their resistances are proportional, respectively, to the volume of the said clear liquid containing portion and of the said solids containing portion.

7. A reader as described in claim 4 which comprises means for returning each of said potentiometers to its zero position prior to the said scanning.

8. A reader as described in claim 4 which comprises means actuated at the end of said scanning movement to complete a circuit through said potentiometers to provide the said volume ratio indication.

9. A reader for reading translucent tubes containing in uninterrupted succession an empty portion, a portion containing a clear liquid, a transparent portion containing solids and a portion which differs from the translucent solids containing portion in respect to its light transmitting characteristics which comprises an inclined slide provided with a groove on its upper surface to receive and support one of said translucent tubes in slidable relation, said slide being inclined at an angle such that a tube so received in said groove will tend to slide lengthwise thereof solely under the influence of gravity, a pusher mechanism mounted on said slide in position to be engaged by the lower end of one of said tubes received in the upper end of said groove, a photocell, a light source spaced from and arranged to direct light at the said photocell, said photocell and light source being so positioned that one of said tubes so positioned in the said groove with its lower end in engagement with the pusher mechanism intersects the path of the light so directed at the said photocell, means for reciprocating said pusher mechanism lengthwise of said groove to cause said tube to be reciprocated lengthwise of the groove under the influence of gravity and of the said pusher mechanism, and to permit the photocell to scan the various portions of the tube in the aforesaid uninterrupted succession and means controlled by the said photocell for indicating the ratio of the volume of the said solids containing portion to the combined volumes of the said solids and clear liquid containing portions of the tube.

10. A reader as described in claim 9 which comprises cam means operating at the completion of the upward stroke of the pusher mechanism to stop the reciprocation of the pusher mechanism and to actuate the said means for indicating.

11. A reader as described in claim 9 in which the means controlled by the photocell comprises a pair of potentiometers, and which comprises means driven in synchronism with the pusher mechanism for driving the said potentiometers.

12. A reader as described in claim 11 in which the means for driving the said potentiometers is driven by the pusher mechanism.

13. A reader as described in claim 11 in which the means for driving the said potentiometers comprises clutch means operable to connect said potentiometers to the said means for driving.

14. A reader as described in claim 12 in which the means for driving the said potentiometers comprises a rack secured to said pusher mechanism and a cooperating pinion rotatably supported on said slide.

15. A reader as described in claim 13 in which the means for driving the said potentiometers comprises a pair of selectively operable clutches, one of which is operable to connect one of said potentiometers to the said means for driving and the other of which is operable to connect the other of said potentiometers to the said means for driving.

16. A reader as described in claim 15 in which the said clutches are magnetic clutches.

17. A reader as described in claim 13 which comprises cam means operating during the down stroke of said pusher mechanism to connect said potentiometers to the said means for driving to drive said potentiometers to their zero resistance positions.

18. A reader as described in claim 17 in which the said potentiometers are provided with mechanical stops at their zero positions and in which the said clutch means permits slippage when said zero positions are reached.

19. A reader for reading translucent tubes containing in uninterrupted succession an empty portion, a portion containing a clear liquid, a transparent portion containing solids and a portion which differs from the translucent solids containing portion in respect to its light transmitting characteristics which comprises an inclined slide provided with a groove on its upper surface to receive and support one of said translucent tubes in slidable relation, said slide being inclined at an angle such that a tube so received in said groove will tend to slide lengthwise thereof solely under the influence of gravity, a pusher mechanism mounted on said slide in position to be engaged by the lower end of one of said tubes received in the upper end of said groove, a photocell, a light source spaced from and arranged to direct light at the said photocell, said photocell and light source being so positioned that one of said tubes so positioned in the said groove with its lower end in engagement with the pusher mechanism intersects the path of the light so directed at the said photocell, means for reciprocating said pusher mechanism lengthwise of said groove to cause said tube to be reciprocated lengthwise of the groove under the influence of gravity and of the said pusher mechanism, and to permit the photocell to scan the various portions of the tube in the aforesaid uninterrupted succession, a pair of potentiometers, means driven in synchronism with said pusher mechanism for driving the said potentiometers, means controlled by the said photocell during the said scanning for controlling the driving of said potentiometers to drive them to positions in which their resistances are proportional, respectively, to the volumes of the said portion of the tube containing a clear liquid and the said portion of the tube containing translucent solids, and means responsive to the said resistances of the potentiometers for indicating the ratio of the volume of the said solids containing portion to the combined volumes of the said solids and clear liquid containing portions of the tube.

20. A reader as described in claim 19 which comprises cam means operating at the completion of the upward stroke of the pusher mechanism to stop the reciprocation of the pusher mechanism and to actuate the said means for indicating.

21. A reader as described in claim 19 in which each of the said potentiometers has a zero position and each when moved from said zero position to any other position has a resistance which is proportional to the extent of such movement.

22. A reader as described in claim 21 in which the means for driving the said potentiometers comprises a rack secured to said pusher mechanism and a cooperating pinion rotatably supported on said slide.

23. A reader as described in claim 22 in which the means for driving the said potentiometers comprises a pair of selectively operable clutches, one of which is operable to provide a driving connection between said pinion and one of said potentiometers and the other of which is operable to provide a driving connection between said pinion and the other of said potentiometers.

24. A reader as described in claim 23 which comprises means controlled by said photocell which operates one of said clutches to connect one of said potentiometers to said pinion as said photocell begins to scan the said liquids containing portion of the tube and to disconnect the said one potentiometer from the pinion as the photocell begins to scan the said solids containing portion of the tube and which operates the other of said clutches to connect the other of said potentiometers to said pinion at substantially the same time the said one potentiometer is disconnected from the pinion and to disconnect the said other potentiometer from the pinion as the photocell begins to scan the portion of the tube immediately following the solids containing portion.

25. A reader as described in claim 24 which comprises means which during the down stroke of said pusher mechanism operates both of said clutches to connect both of said potentiometers to said pinion to drive both of said potentiometers to their zero positions.

26. A method of reading a translucent tube containing in uninterrupted succession an empty portion, a portion containing a clear liquid, a translucent portion containing solids and a portion which differs from the traslucent solids containing portion in respect to its light transmitting characteristics which comprises scanning the various portions of the tube in the aforesaid uninterrupted succession by passing a beam of light through the tube into a photocell, utilizing the responses of the photocell during the said scanning to set two potentiometers so that they have resistances which are proportional, respectively, to the volume of said liquid containing portion and to the volume of said solids containing portion and reading the ratio of the voltage drop across the potentiometer having a resistance proportional to the solids containing portion to the voltage drop across the two potentiometers in series.

References Cited

UNITED STATES PATENTS

| | | | |
|---|---|---|---|
| 2,104,525 | 1/1938 | Proskowriakoff | 73—61.4 |
| 2,980,802 | 4/1961 | Bracey et al. | 250—218 |
| 2,982,170 | 5/1961 | Wyss | 356—39 |
| 3,291,693 | 12/1966 | Brown | 73—61 |

FOREIGN PATENTS

| | | | |
|---|---|---|---|
| 1,138,862 | 1957 | France | 356—39 |
| 1,214,144 | 1959 | France | 73—61.4 |
| 1,500,330 | 1967 | France | 73—61 |

RONALD L. WIBERT, Primary Examiner

J. ROTHENBERG, Assistant Examiner

U.S. Cl. X.R.

73—149; 250—218; 356—201